May 27, 1941.  A. LEBER  2,243,383

PHOTOELECTRIC EXPOSURE METER

Filed Feb. 10, 1939

Patented May 27, 1941

2,243,383

UNITED STATES PATENT OFFICE 2,243,383

PHOTOELECTRIC EXPOSURE METER

Alois Leber, Vienna, Germany

Application February 10, 1939, Serial No. 255,668
In Germany January 10, 1939

4 Claims. (Cl. 88—23)

A serious disadvantage of the exposure meters hitherto known consists in that the values obtained by measuring do not correspond to the actual effect of the light in the photographic apparatus, because only a mean value of the whole of the light radiated from the object can be caught by these exposure meters. It is therefore not possible to obtain directly a predetermined blackening of the negative, that is to order the picture in the approximately rectilineal portion of the gradation curve. This shows, that it is necessary to measure the brightness interval of the portions of the object which are important for the picture so as to be able to ascertain whether the brightness interval is not too large for the emulsion of the light sensitive material used.

The object of the invention is, to produce an exposure meter which enables the measurement of a directive light beam with a very small space angle and consequently the determination of the illuminating intensity of individual portions of the object, especially the brightest and darkest portions. Comparison light photometers have already been built for this purpose, but the objection to these is the necessity of a source of artificial light for comparison and the fluctuating light intensity of the same.

The invention overcomes these objections and renders unnecessary the arrangement of a source of artificial light for comparison. This is attained according to the invention in that on the photo-electric exposure meter means are provided, which enable a comparison of the light intensity of a point to be measured on the object to be photographed with the light radiation for a region surrounding the exposure meter when in use.

Two embodiments of the invention are illustrated, by way of example, in the accompanying drawing, in which—

I and 2 designate the means, which enable a comparison of the illuminating intensity of a point to be measured on the object to be photographed with the light radiation from a region surrounding the exposure meter. They are constructed as light passages, of which the light passage I is filled with a light diffusion means, for example opal glass, whereas the light passage 2 allows the unimpeded passage of the light without diffusion (directive light). Both light passages I and 2 pass through the casing 3 and may be directed towards the observer. For the comparison of the light passing into the instrument through the two light passages I, 2, known light comparing arrangements, such as a Lummer-Brodhun cube, may be used.

Figure 1:
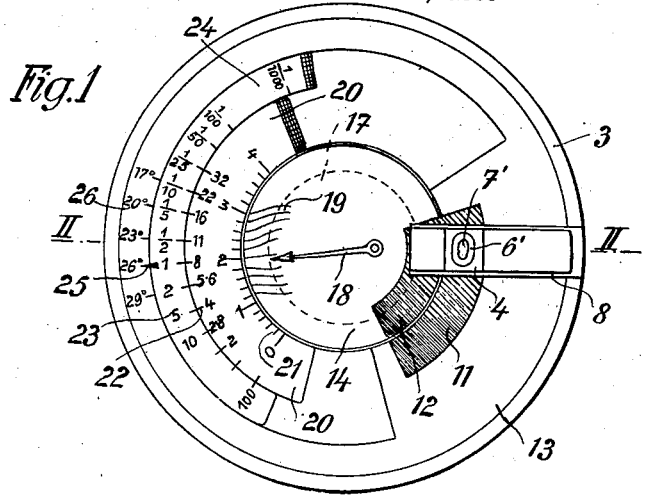
Fig. 1 shows an elevation of the side of the instrument directed towards the observer when using the instrument.
Figure 2:
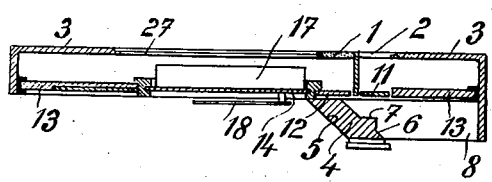
Fig. 2 is a section on line II—II of Fig. 1.

According to the form of construction illustrated in Figs. 1 and 2 the light comparing arrangement is formed by a prism 4 which allows the light coming from the opal glass I to reach the eye of the observer after two total reflections by the surfaces 5 and 6. The directive light entering through the passage 2 reaches the eye of the observer on a straight path through the surface 7. The observer therefore sees the two kinds of light brought together in such a manner that the directive light fills the central region 7' and the diffused light fills the surrounding region 6' (Fig. 1). The prism 4 is secured on the casing 3 by means of a strap 8.

Figure 3:
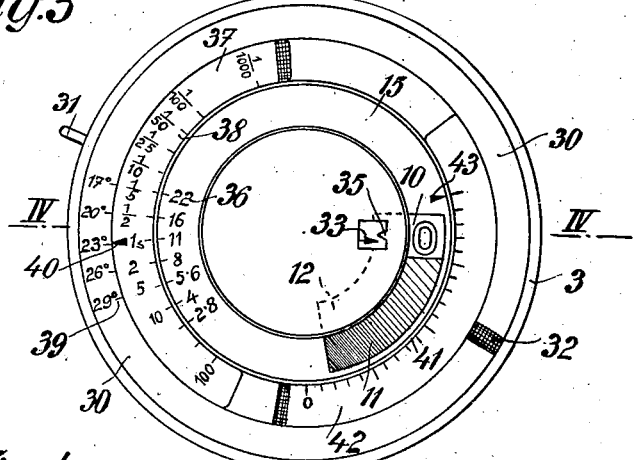
Fig. 3 shows a modified form of construction of the instrument in an elevation similar to that of Fig. 1.
Figure 4:
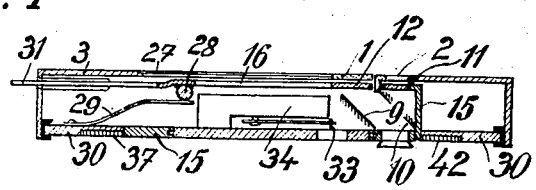
Fig. 4 is a section on line IV—IV of Fig. 3.

According to the form of construction illustrated in Figs. 3 and 4 two mirrors 9, 10 are used instead of the prism 4 (Fig. 2), which mirrors bring, for the purpose of comparison, the diffused light entering at I and the directive light passing through 2 into two adjacent fields, in a similar manner as the prism. To enable the brightness of the two adjacent fields to be equalized, darkening means constructed as grey wedges II, 12 are provided. The grey wedges II, 12 arranged on concentric rings are, for this purpose, rotatable relatively to each other and, according to the construction illustrated in Figs. 1 and 2, they are connected with the concentric ring 13 and with the circular disc 14. According to the construction illustrated in Figs. 3 and 4 the grey wedge II is connected with a ring 15 and the grey wedge 12 with a disc 16. This modified form of construction will be described later.

The disc 14 according to Figs. 1 and 2 carries the electric measuring instrument 17 for the photo current which instrument participates in the movements of the disc 14. 18 is the hand of the instrument and is preferably provided with a stop. This hand points by means of lead lines 19 provided on the disc 14 to a sector 20 shiftable on the ring 13 and bearing a linear light intensity scale 21. On this sector 20 the stop scale 22 is arranged which registers with another scale 23 giving the exposure times, the scale 23 being on a sector 24 also shiftable on the disc 13.

The two sectors 20 and 24 are arranged on the ring 13 in such a manner that each sector can be moved independently without displacing the other sector or the ring 13. On the other hand, both sectors 20 and 24 participate in any displacement of ring 13. A mark 25 and a scale 26, the latter applied directly on the ring 13, serve for setting to different emulsion light sensitivities.

The current for the measuring instrument 17 is supplied by the photo-cell 27. The photo-cell 27 and the opal glass 1 lie in the same plane, so that both the photo-cell and also the opal glass embrace the same space angle for the impinging diffused light.

In the form of construction illustrated in Figs. 3 and 4 the disc 16 does not carry the measuring instrument for the photo-current, but a series- or parallel-resistance 28. The associated sliding contact 29 is fixed on the ring 30. The disc 16 can be rotated by a lever 31 and the ring 30 by a handle 32 (Fig. 3). By the relative displacement of the elements 16 and 30 the photo-current is strengthened or weakened, so that the hand 33 of the measuring instrument 34 can be brought on to the zero mark 35 of the measuring instrument. The element 15 carrying the grey wedge 11 bears a stop scale 36. A sector 37 is shiftably arranged opposite the scale 38 on the concentric ring 30, and bears a scale 38 for the exposure times. On the ring 30 proper there is a scale 39 for the emulsion light sensitivities to which a mark 40 provided on the sector 37 is co-ordinated. The light density scale 41 is, according to this form of construction, arranged on a sector 42 which is shiftable on the element 30.

The manipulation of the exposure meter according to Figs. 1 and 2 is as follows:

If it is desired to measure the light density at a point on the object to be photographed, this point is viewed through the light passage 2. If the brightness of the viewed portion of the picture is greater or less than the brightness of the opal glass illuminated by the diffused light, the person using the instrument sees the sections 6', 7' (Fig. 1) in different degrees of brightness. The brightnesses of the surfaces 6', 7' are then equalized by correspondingly turning the grey wedges 11, 12 or the ring 13 and the disc 14. The hand 18 of the measuring instrument 17 will be deflected by the diffused light impinging upon the photo-cell 27 during the taking of the measurement and which is proportional to that impinging upon the opal glass 1. By turning the sector 20 the zero point of the scale 21 is set over the corresponding leading line 19 opposite the position of the hand. Previously, by setting the sector 24 with the mark 25 to the corresponding plate sensitivity determined by the material to be used, the instrument has been set in such a manner that the exposure data can be read on the scales 22 and 23. The tables are preferably so gauged that, when measuring the darkest point of the object most important for the picture, the corresponding blackening occupies the lower position of the gradation curve. The brightest pictorially important point of the same object to be photographed can then be measured, the light contrast of the object being then directly readable on the light density scale 21 whose zero point has already been adjusted during the measurement of the darkest pictorially important point.

The manipulation of the exposure meter illustrated in Figs. 3 and 4 is as follows:

For example the darkest pictorially important portion of the object to be photographed is viewed through the light passage 2, any inequality of brightness of the comparison fields being equalized by turning the grey wedges 11 and 12 or the ring 15 and disc 16. Hereupon the resistance 28 is varied by turning the ring 30 so that the hand 33 points to the zero point 35. The exposure data can then be read on the scales 36 and 38.

If it is desired to carry out a light contrast measuring with this form of construction, the brightest pictorially important point is preferably measured first. Then the zero point of the scale 41 is brought opposite the mark 43. At the subsequent measuring of the darkest pictorially important point the mark 43 indicates on the scale 41 the amount of contrast of the brightness of the object to be photographed. The scales 21 and 41 (Figs. 1 and 3 respectively, are preferably logarithmic scales.

Difficulties caused during the turning of the comparison fields by different colors of these fields may be avoided by darkening the two fields as much as possible.

I claim:

1. In a photoelectric exposure meter, the combination of a casing having an opening in the front thereof, a disk of light-diffusing material in said casing and exposed to the light entering the casing from said opening, a photoelectric cell exposed to the same light radiation, said casing having a light passage therein constituting a view passage for observing the object points, said casing having a second light passage wherein said disk is mounted, means for equalizing the intensity of the light passage through said passages, means for measuring the current produced by the photoelectric cell and comparison scales each connected to a respective one of said means for indicating the relative intensity of the light passage through said passages.

2. The meter of claim 1 wherein a third scale is carried by the casing in parallelism with one of the other scales and indicating the exposure times.

3. The exposure meter of claim 1 wherein the measuring instrument is provided with a hand and is provided with operating means for said hand and a resistance for normally maintaining the hand at the zero point of one of said scales.

4. The exposure meter of claim 1 wherein one of the light passages is provided with a movable member graduated in resistance to the passage of light from one end to the other.

ALOIS LEBER.